United States Patent [19]

Vierk

[11] Patent Number: 4,986,397
[45] Date of Patent: Jan. 22, 1991

[54] LOCK-UP PISTON PLATE FOR RECIRCULATING FLOW TORQUE CONVERTER

[75] Inventor: David T. Vierk, Naperville, Ill.

[73] Assignee: Borg-Warner Automotive, Inc., Sterling Heights, Mich.

[21] Appl. No.: 436,530

[22] Filed: Nov. 14, 1989

[51] Int. Cl.⁵ .................. F16H 45/02; F16D 13/72
[52] U.S. Cl. ........................... 192/3.3; 192/107 R; 192/113 B
[58] Field of Search .............. 192/3.29, 3.3, 70.12, 192/70.14, 107 R, 113 B

[56] References Cited

U.S. PATENT DOCUMENTS

| | | | |
|---|---|---|---|
| 2,841,262 | 7/1958 | Zeidler | 192/70.12 |
| 3,253,684 | 5/1966 | Maurice | 192/113 B X |
| 4,177,885 | 12/1979 | Ross | 192/3.3 |
| 4,181,203 | 1/1980 | Malloy | 192/3.3 |
| 4,199,047 | 4/1980 | Ling | 192/3.3 |

FOREIGN PATENT DOCUMENTS 58-30532 2/1983 Japan ....................... 192/113 B

*Primary Examiner*—Richard Lorence
*Attorney, Agent, or Firm*—Reising, Ethington et al.

[57] ABSTRACT

A piston plate for providing a lock-up of a hydrodynamic torque transmitting unit has a friction lining bonded to a flat area thereon near the outer diameter which is arranged to slip with respect to the front cover of a rotating housing of the torque converter. The friction lining has an annular sealing segment to seal fluid leakage across the lining; and a plurality of grooves is formed from the outside diameter of the lining to an intermediate point on the width to communicate through an axial hole in the piston plate to provide a path for flow of cooling fluid through the lining for removing heat build up therefrom; the source of the cooling fluid also is the fluid source for applying pressure to the plate for providing lock-up in the torque transmitting unit.

9 Claims, 2 Drawing Sheets

LOCK-UP PISTON PLATE FOR RECIRCULATING FLOW TORQUE CONVERTER

FIELD OF THE INVENTION

This invention relates to hydrodynamic torque converter and coupling devices and more particularly to a hydrodynamic unit having a selectively engageable friction clutch for establishing a mechanical drive in parallel with a hydraulic drive.

BACKGROUND OF THE INVENTION

Various proposals have been suggested for including a selectively engageable friction clutch within a hydrodynamic torque converter to split torque or for producing an all mechanical drive. Such clutch or lock-up constructions are particularly advantageous in change speed torque converter transmissions for vehicles to increase the transmissions, operating efficiency.

In some clutch devices, split torque usage is limited to small diameter clutches where oil pressure effects are small or on lock-up clutches where differential speeds are low. For example, if there is a shift from an open converter to a split torque drive for cruise operation in a torque converter transmission, the centrifugal pressures on opposite sides of the clutch plate mounted in the hydraulic unit can be unequal and thereby can make the clutch application and release difficult to calibrate.

An object of the present invention is to provide a lock-up clutch arrangement wherein pressure fluid is applied only to one face of the clutch plate and the clutch plate is continuously slipped with respect to a cover portion of a rotary housing of a fluid torque converter to minimize the response time to apply a lock-up force between the clutch plate and the rotating housing either to produce a split torque drive or to produce an all mechanical drive.

Various proposals have been suggested for engaging the friction element of the lock-up in such torque converters U.S. Pat. No. 2,404,657 discloses an arrangement where valves for directing fluid pressure onto the friction plate are activated by centrifugal force. In the arrangement there is no cooling flow once the friction plate is engaged.

U.S. Pat. No. 3,972,400 discloses the use of friction plates run in a fluid. Various groove patterns are suggested for directing flow from the inside diameter of the friction plates to the outside diameter thereof. The provision of grooves across the entire width of the facing would leak in a torque converter application where it is desirable to seal the activating fluid from the outboard face of a piston plate for carrying friction material that is engageable with the front cover of a rotatable housing of a torque converter for producing a desired lock-up therein.

U.S. Pat. No. 4,445,599 discloses a torque converter lock-up system which provides cooling flow once the lock-up is engaged. In this arrangement, passages are provided through a metal piston plate to cool the locked up clutch rather than providing for flow through grooves in the friction material. The fluid flow in the −599 arrangement, again, will provide a leakage path for flow of the pressurizing fluid from the unit during lock-up.

U.S. Pat. No. 4,462,492 is like the arrangement in the U.S. Pat. No. 4,445,99. Again, the coolant arrangement is through a piston plate material, rather than the friction material and the path again constitutes a leakage path for the energizing fluid.

U.S. Pat. No. 4,638,897 discloses a lock-up plate that has a notch in friction material and a hole through an adjacent steel plate for the friction material. The hole through the adjacent steel plate is utilized to define a leakage path which is used in conjunction with the cover plate of the torque converter to modulate pressure across the plate. The hole is not used for cooling a frictional running surface which continuously slips across the cover of a rotating housing of a torque converter.

SUMMARY OF THE INVENTION

A feature of the present invention is to provide a hydrodynamic torque converter or coupling unit having a fluid operated clutch therein selectively engageable by fluid to provide a mechanical drive through the unit and having friction lining thereon that will seal against leakage across the outboard surface of the friction clutch and having passage means for directing the actuating fluid through the friction material to remove heat therefrom as the facing is continuously slipped with respect to the front cover portion of the hydrodynamic torque converter.

A further feature of the present invention is to provide such a hydrodynamic torque converter or coupling unit wherein the fluid operated friction clutch includes a piston plate having friction lining material bonded to a flat area on the outer diameter area thereof and wherein the friction lining has a continuous circumferential annular seal segment at the inside diameter thereof for sealing against fluid leakage radially outwardly of the outboard surface of the piston plate and wherein a plurality of grooves are formed in the lining radially outwardly of the continuously formed annular seal segment for promoting oil circulation through the lining for removing heat therefrom during a continuously slipping torque converter lock-up mode of operation.

An object of the present invention is to provide for continuous slipping actuation of a torque converter lock-up clutch with respect to a cover of a rotating housing of a torque converter by the provision of means therein for continuously removing heat from a friction liner on the slipping torque converter lock-up clutch while providing for a radial seal across the friction lining during the slip operation.

These and other objects, features and advantages of this invention will become more apparent from the detailed description and drawing of a preferred embodiment thereof.

DETAILED DESCRIPTION OF THE PREFERRED EMBODIMENT

Figure 1:
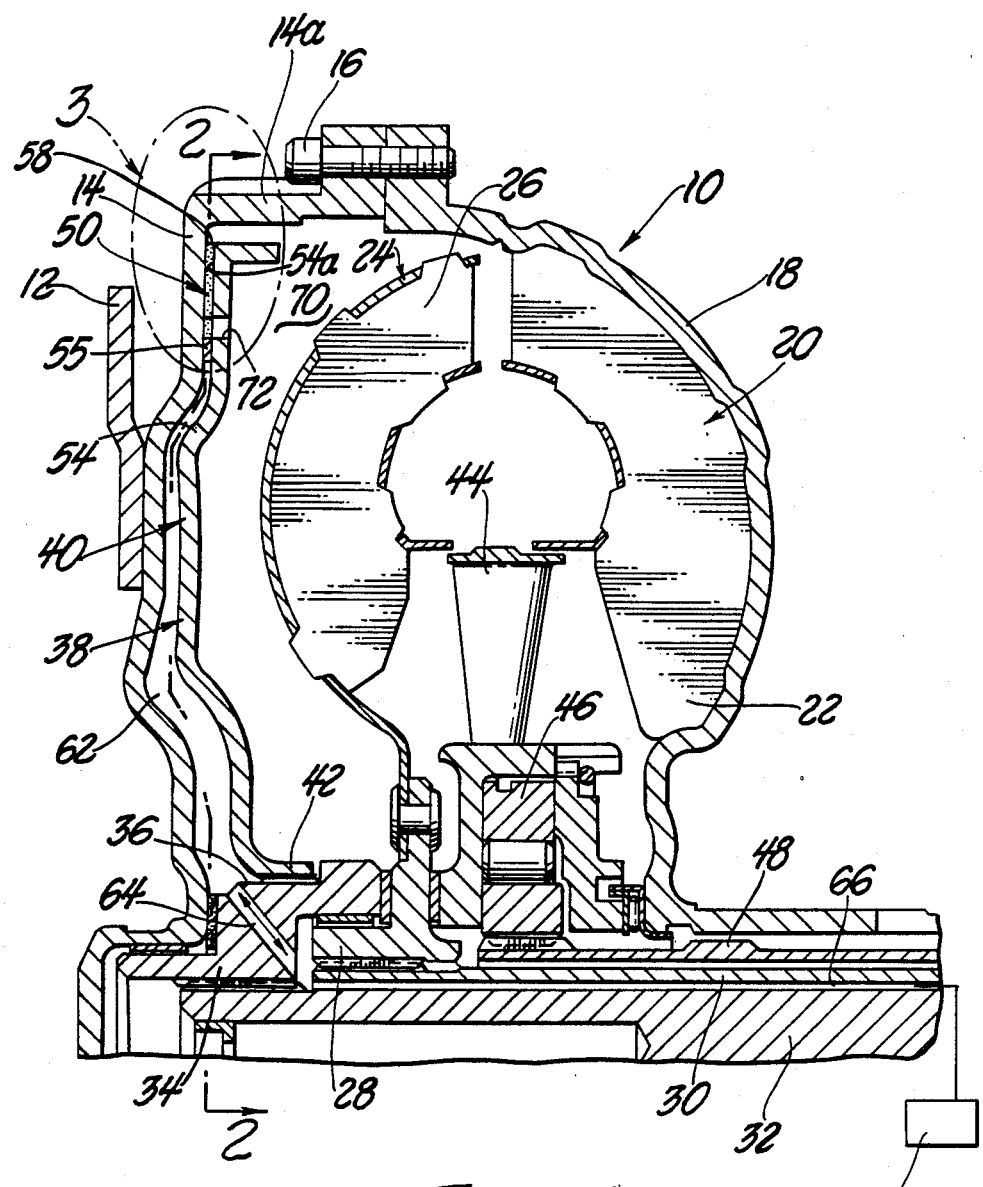
FIG. 1 is a cross-sectional view of an upper portion of a hydrodynamic torque converter including the present invention.
Figure 2:
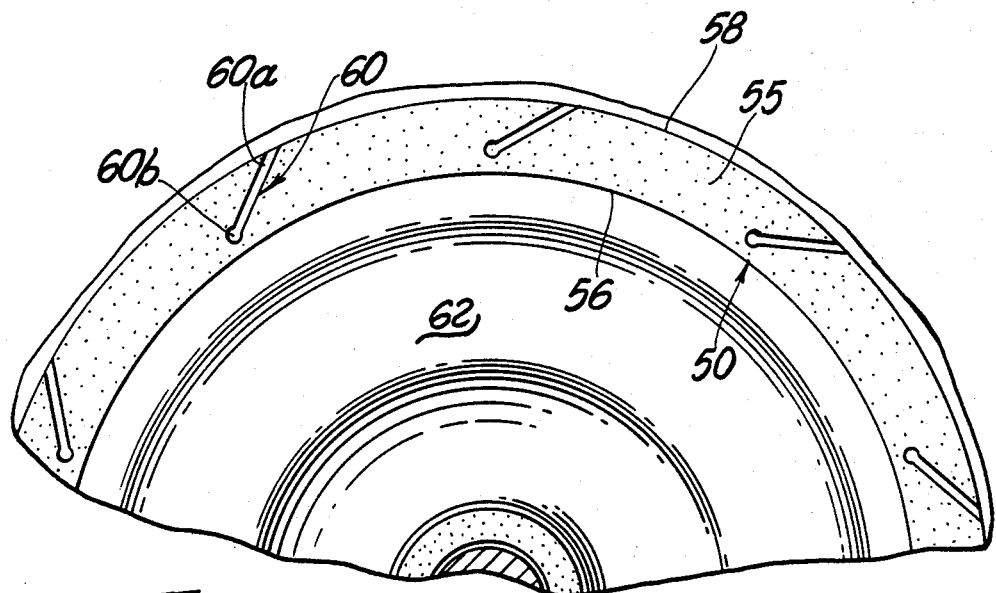
FIG. 2 a fragmentary cross-sectional view taken along the line 2—2 of FIG. 1, looking in the direction of the arrows.
Figure 3:
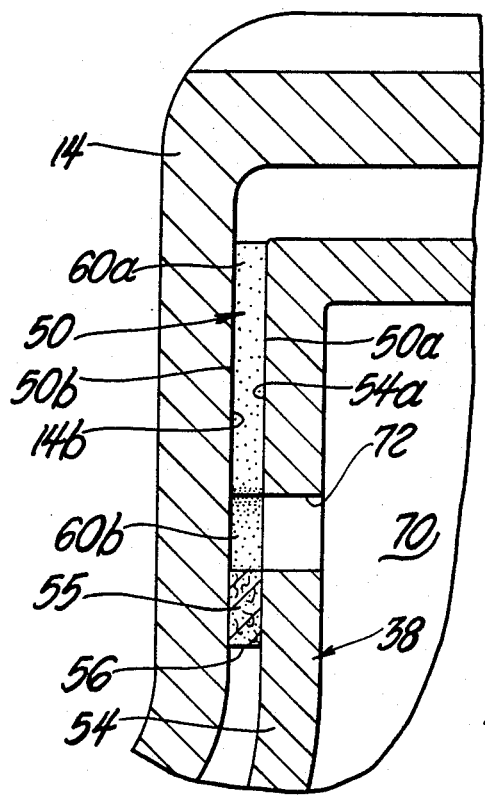
FIG. 3 is an enlarged fragmentary sectional view of circled region 3 in FIG. 1.

Referring now to FIG. 1, a hydrodynamic torque transmitting unit 10 is illustrated of the recirculating flow type, hereinafter referred to as a torque converter.

The torque converter 10 includes an input lug 12 connected to a rotatable annular front cover 14. The front cover 14 is connected by suitable fastener means such as lugs 16 to a rear cover 18. Located within the rotatable front cover and rear cover 18 is located a pump 20 having a plurality of blades 22 forming a torus operatively connected to the rear cover 18. A turbine 24 with a plurality of blades 26 is drivingly connected to a hub 28 splined to a torque transmitting sleeve shaft 30.

The sleeve shaft 30 is of the type adapted to be connected to a transmission and, in particular, can be connected to a sun gear of a planetary gear unit by suitable clutch means, as is well known in the art.

The sleeve shaft surrounds a rotatable torque transmitting shaft 32 that extends concentrically within the sleeve shaft 30 in a rearward direction where it can be drivingly connected to a ring gear of a transmission, as is known in the prior art.

The forward end of the torque transmitting shaft 32 is spline connected to a front annular hub 34.

The front annular hub 34 has an annular shoulder 36 which connects to a piston plate 38 of a torque converter lock-up clutch 40 constructed in accordance with the present invention. More specifically, the piston plate 38 has an axially directed flange 42 thereon that is secured to the annual hub 34 for rotation therewith.

The torque converting lock-up clutch 40 is adapted to be energized by hydraulic pressure produced in the torque converter 10 as the pump 20 and turbine 24 are rotated with respect to a bladed stator 44 which is connected through a one way brake 46 to a ground sleeve 48 located radially outwardly of and coaxially along the torque transmitting shaft 32.

In accordance with one aspect of the present invention, the lock-up clutch 40 includes a friction lining 50 having a surface 50a thereon bonded to a flat surface portion 54a of the outboard face 54 of the piston plate 38. The friction lining 50 further includes an annular seal segment 55 formed continuously circumferentially around the inside diameter surface 56 of the friction lining 50. The friction lining 50 further includes a radially outwardly located outside diameter. Surface 58 thereon which is located radially inwardly of an axially directed flange portion 14a of the front cover 14. The friction lining 50 further includes a plurality of coolant passages 60 each including a radially angled segment 60a that is located at an inclination with respect to radial lines through the friction lining 50. The radially angled segments 60a only extend across part of the width of the friction lining 50 and start at a point located radially outwardly of the inside diameter surface 56 and the annular seal segment 55 so that the seal segment 55 will seal a void space 62 located between the outboard surface 38a of the piston plate 38 and the inboard surface 14b of the front cover 14. The void space 62 may be relieved of pressure or pressurized through a passage 64 in hub 34 and a transmission passage 66. The annular seal segment 55 will prevent leakage of the actuating fluid back into the void space 62 during energization of the lock-up clutch 40.

In accordance with the present invention, the piston plate 38 is actuated when fluid is exhausted from space 62 through a converter clutch control valve 65. The piston plate 38 is released (disengaged) when space 62 is pressurized by feeding transmission fluid to the converter from converter clutch control valve 65 through passage 66, passage 64 and into void space 62.

The piston plate 38 can be operated to apply a continuously slipping torque between the front face 50b of the friction lining 50 and the inboard surface 14b of the front cover 14. The radially angled segments 60a of the coolant passages 60 will receive pressure fluid from a pressure space 70 through inlet openings 72 in the piston plate 38 that are directed axially therethrough at a point radially outwardly of the annular seal segment 55. The inlet openings 72 align with axial inlet openings 60b of the coolant passages 60. The piston plate 38 will be rotated by the rotatable housing of the torque converter 10 to cause fluid flow through the radially angled segment 60a by a combination of centrifugal force action thereon and a shear force produced by the angle of the groove 60a on fluid forced therein from the pressure space 70. Additionally, there is a pressure differential between space 70 and the outlet of passage 60 at the outside diameter of lining 50. The groove arrangement thus continuously flows fluid through the friction lining 50. The fluid flow removes heat build-up from the friction lining 50 thereby enabling it to be continuously slipped on the cover 14 and run at higher energy levels as compared to conventional continuous slip lock-up clutch devices.

The aforedescribed configuration of the friction lining enables the fluid that produces the application pressure on the piston plate 38 also to be used as cooling flow without leakage back into a void space 62 between the outboard surface of the piston plate 38 and the rotating front cover 14. The piston plate and friction lining 50 of the present invention are shown in association with a torque converter having high capacity large diameter pump and turbine components, it is equally suitable for use in any hydrodynamic torque converter having a rotatable housing and including an actuatable piston plate for locking up a clutch component of a torque converter.

By virtue of the construction, the piston plate 38 has an engagement force to the left as illustrated, which is primarily dependent on pressure within a single pressure space 70, thereby to avoid the need for controls to balance and modulate pressures on either side of the piston plate 38'.

Such a single biasing pressure provides for excellent control of the clutch in a continuous slip mode of operation regardless of pump turbine or clutch plate speed.

Although a preferred embodiment of the invention has been shown and described for purposes of illustrating the invention, other embodiments will be apparent to those skilled in the art. Accordingly, the invention is not to be limited by the particular embodiment shown and described, but only by the following claims.

What is claimed is:

1. A hydrodynamic torque transmitting unit having input and output rotors in a rotating housing with a front cover engageable with a piston plate energizable by fluid pressure to lock up the torque transmitting unit and including a pressure space on one side of the piston plate and a void on the other side of the piston plate between said piston plate and said front cover having a pressure differential thereacross which will cause said piston plate to continuously slip with respect to said front cover comprising:

an annular friction facing means on said piston plate;
said annular friction facing means including means engageable with said front cover for sealing said void space against radial fluid flow from the inside diameter of said annular friction facing means to the outside diameter of said annular friction facing means; and passage means in said annular friction facing means for circulating fluid from said pressure space across said annular friction facing means between said seal means and said outside diameter of said friction facing means to remove heat from said annular friction facing means as said annular friction facing means is continuously, slipped with respect to said front cover.

2. The hydrodynamic torque transmitting unit of claim 10 further characterized by said passage means including means for circulating coolant flow by centrifugal force produced by rotation of the piston plate.

3. The hydrodynamic torque transmitting torque transmitting unit of claim 1 further characterized by said passage means including radially angled segment for applying a shear force on the pressure fluid during rotation of said piston plate.

4. The hydrodynamic torque transmitting unit of claim 1 further characterized by said piston plate having an inboard face exposed to said pressure space and further having an outboard face supporting said annular friction facing means;

fluid pressure in said pressure space acting on said piston plate to cause it to continuously slip with respect to said front cover; and means for directing fluid from said pressure space to said passage means for flow through said direction facing means for removing heat therefrom.

5. A piston plate for use in a hydrodynamic torque transmitting unit having a rotatable housing with a cover; said piston plate having an annular friction lining bonded thereto for producing a lock-up force on the cover of a rotatable housing of the hydrodynamic torque transmitting unit characterized by:

said friction lining having a continuous uninterrupted annular seal segment adapted to engage the cover plate for sealing against fluid flow from the outside diameter through the inside diameter of said annular friction lining in a radial direction; means forming a coolant passage through the friction lining radially outwardly of said annular seal segment for flow of coolant fluid through the friction lining for removing heat therefrom.

6. The piston plate of claim 5, further characterized by said means forming the coolant passage including means for circulating cooling fluid across the friction lining only radially outwardly of said annular seal segment.

7. The piston plate of claim 6, further characterized by said opening including a plurality of grooves in the lining each having an inlet end located radially outwardly of the solid annular seal segment and an outlet opening located in the O.D. of the friction lining.

8. The piston plate of claim 6, further characterized by said cooling passage including a groove radially inclined through the friction lining material having an inlet located radially outwardly of the solid annular seal segment and an outlet located at the radially outermost surface of the friction lining.

9. The piston plate of claim 8 further including an axial hole through both the lining and the piston plate for forming the inlet to the radially inclined groove.

* * * * *